US012693098B2

(12) United States Patent
Schwippl

(10) Patent No.: US 12,693,098 B2
(45) Date of Patent: Jul. 28, 2026

(54) MOUNTING DEVICE

(71) Applicant: KNDS DEUTSCHLAND GMBH & CO. KG, Munich (DE)

(72) Inventor: Christian Schwippl, Munich, DE (US)

(73) Assignee: KNDS DEUTSCHLAND GMBH & CO. KG, Munich (DE)

( * ) Notice: Subject to any disclaimer, the term of this patent is extended or adjusted under 35 U.S.C. 154(b) by 11 days.

(21) Appl. No.: 18/836,483

(22) PCT Filed: Feb. 7, 2023

(86) PCT No.: PCT/DE2023/100092
§ 371 (c)(1),
(2) Date: Aug. 7, 2024

(87) PCT Pub. No.: WO2023/151756
PCT Pub. Date: Aug. 17, 2023

(65) Prior Publication Data
US 2025/0137756 A1 May 1, 2025

(30) Foreign Application Priority Data
Feb. 9, 2022 (DE) ..................... 10 2022 102 991.3

(51) Int. Cl.
*F41H 5/013* (2006.01)
*F16B 31/02* (2006.01)
*F41H 7/04* (2006.01)
(52) U.S. Cl.
CPC ............. *F41H 5/013* (2013.01); *F16B 31/02* (2013.01); *F41H 7/04* (2013.01)

(58) Field of Classification Search
CPC .. F41H 5/013; F41H 7/04; F16B 31/02; F16B 39/36; F16B 43/00
(Continued)

(56) References Cited

U.S. PATENT DOCUMENTS 89,066 A * 4/1869 Nichols ................... F16B 39/36
279/100
205,712 A * 7/1878 Whitmarsh ............. F16B 39/32
411/935
(Continued)

FOREIGN PATENT DOCUMENTS

DE 3835543 C1 1/1990
DE 202005000198 U1 5/2006
(Continued)

OTHER PUBLICATIONS

European Patent Office (ISA/EP), International Search Report (with English translation), International Application No. PCT/DE2023/100092, 6 pages, Apr. 28, 2023.

*Primary Examiner* — Joshua E Freeman
(74) *Attorney, Agent, or Firm* — Thompson Hine LLP

(57) ABSTRACT
A mounting device for mounting a protective element, in particular on a vehicle, with a mounting element extending along a mounting axis, wherein the protective element can be mounted in a mounting plane via a screw connection with a defined tightening torque. The mounting element has a mounting surface which is arranged offset outwards in the axial direction relative to the mounting plane and on which an external load can be mounted via a second screw connection with a second tightening torque in such a way that the first and second tightening torques are independent of one another.

19 Claims, 4 Drawing Sheets

(58) Field of Classification Search
USPC ................................................. 42/40.02, 937
See application file for complete search history.

(56) References Cited

U.S. PATENT DOCUMENTS

| | | | | |
|---|---|---|---|---|
| 3,280,690 A * | 10/1966 | Rubin | .................. | F16B 31/028 |
| | | | | 411/1 |
| 3,659,491 A * | 5/1972 | Duffy | ...................... | F16B 43/00 |
| | | | | 411/436 |
| 4,021,991 A * | 5/1977 | Hotz | ......................... | F16B 2/14 |
| | | | | 403/387 |
| 4,083,288 A * | 4/1978 | Williams | ........... | F16B 37/0892 |
| | | | | 411/436 |
| 4,398,446 A * | 8/1983 | Pagano | ................... | F41H 5/013 |
| | | | | 89/36.17 |
| 4,957,403 A * | 9/1990 | Corain | ................. | F16B 43/009 |
| | | | | 411/368 |
| 5,007,326 A * | 4/1991 | Gooch, Jr. | ............. | F41H 5/013 |
| | | | | 89/36.02 |
| 5,085,550 A * | 2/1992 | Kendrick | ................ | F16D 1/072 |
| | | | | 411/533 |
| 8,267,003 B1 * | 9/2012 | Lou | ......................... | F41H 5/013 |
| | | | | 89/929 |
| 2005/0257677 A1 * | 11/2005 | Ravid | ...................... | F41H 5/023 |
| | | | | 89/36.02 |
| 2006/0117861 A1 * | 6/2006 | Komine | .................. | F16B 31/02 |
| | | | | 73/761 |
| 2006/0213360 A1 * | 9/2006 | Ravid | ................... | F41H 5/0492 |
| | | | | 89/36.01 |
| 2010/0140408 A1 * | 6/2010 | Stabenau | ................ | F41H 5/013 |
| | | | | 244/131 |
| 2013/0205981 A1 * | 8/2013 | Bayer | .................... | F41H 5/013 |
| | | | | 89/36.02 |
| 2014/0060303 A1 * | 3/2014 | Enck | ........................ | F41H 7/042 |
| | | | | 89/937 |
| 2019/0101360 A1 * | 4/2019 | Stewart | ..................... | F41H 7/02 |

FOREIGN PATENT DOCUMENTS

| | | | |
|---|---|---|---|
| DE | 102011053564 A1 | 3/2013 |
| DE | 102014005092 A1 | 10/2015 |

* cited by examiner

MOUNTING DEVICE

CROSS-REFERENCE TO RELATED APPLICATIONS

This application is a national stage filing of International (PCT) Application No. PCT/DE2023/100092, corresponding to International Publication No. WO 2023/151756, filed on Feb. 7, 2023, which in turn claims priority to German Application No. 10 2022 102 991.3 filed on Feb. 9, 2022. The entire contents of both of those applications are hereby incorporated by reference.

The disclosure relates to a mounting device for mounting a protective element, in particular on a military vehicle, with a mounting element extending along a mounting axis, wherein the protective element can be mounted in a mounting plane via a screw connection with a defined tightening torque. Further advantages relate to a protective device for protecting a military vehicle and a method for mounting a protective element.

BACKGROUND

Mounting devices of the aforementioned type have proven their worth in practice and can be used, for example, to attach additional protective elements to the exterior of military vehicles, thereby increasing the overall protective effect.

Generally, mounting elements that extend along a mounting axis are used to connect the protective elements to the vehicle, allowing the protective elements to be bolted to the vehicle. This is because the protective elements can be detachably connected to the vehicle via such a screw connection and can therefore be removed or replaced with other protective elements in a comparatively simple manner.

In the simplest case, the mounting element can be a threaded rod connected to the vehicle, which extends through the protective element and onto which a nut can be screwed. The nut can be used to press the protective element against the outside of the vehicle in a mounting plane with a defined tightening torque and thus connect it to the vehicle. As the protective element rests directly on the outer surface of the vehicle when mounted, the mounting plane corresponds to the outer surface of the vehicle.

Although such mounting devices have proven themselves in practice, problems can arise if additional external loads are to be attached to the mounting element. This is because if an external load is pressed against the protective element via a nut that can also be screwed onto the mounting element, this increases the tightening torque acting on the protective elements. The first or inner tightening torque is then inevitably greater than the second outer tightening torque. Problems can arise in particular if the protective element is hollow or at least partially hollow, so that the first tightening torque must not exceed low limit values, but the external load requires a comparatively high tightening torque, e.g. due to high weight.

SUMMARY

Based on this, the disclosure discloses a mounting device which allows the mounting of external loads, but in which the tightening torque of the protective element is not excessively increased by the external loads.

The external load can be connected to or mounted on the vehicle largely independently of the protective element via the mounting surface, which is offset outwards in the axial direction compared to the mounting plane. The tightening torque of the external load only acts on the mounting surface or the mounting element, but not on the protective element, so that the first tightening torque is not increased by the second tightening torque. The two tightening torques are therefore independent of each other and the second tightening torque can be greater than the first tightening torque. In this respect, protective elements that only tolerate a low tightening torque and external loads that require a high tightening torque can be used simultaneously. The mounting device allows the simultaneous mounting of a protective element and an external load using just a single mounting element.

It may be advantageous if the mounting element can be connected to the outside of the vehicle, in particular to a slug arranged on the outside of the vehicle. The slug can enable a reliable connection of the mounting element and thus also of the protective element and the external load to the vehicle. The mounting element can be screwed into the slug so that it can be connected to and disconnected from the slug in a comparatively simple manner. In this respect, the slug can have an internal thread into which the mounting element can be screwed. In this respect, the slug can be designed like a screw socket. To ensure a reliable connection via the slug, it can be firmly connected, in particular welded, to the vehicle or to the outside of the vehicle.

With regard to the geometric design of the mounting element, it may be advantageous if it is cylindrical in shape. A cylindrical mounting element creates the possibility of a screw connection that enables both a stable but also a detachable connection between the protective element and the external load. In this respect, the mounting element can be designed in the form of a screw that extends along the mounting axis. The mounting element can be designed to be rotationally symmetrical, whereby the mounting axis can run through the centre of the mounting element and thus form its axis of symmetry. The mounting axis can extend perpendicular to the mounting plane and therefore also perpendicular to the outside of the vehicle. If the mounting element is connected to the slugs or screwed into them, the mounting element can therefore protrude horizontally in relation to the outside of the vehicle.

In a further development of the assembly element, it may be advantageous if it has a first thread to form the first screw connection and a second thread to form the second screw connection. In this respect, the first thread can be assigned to the first screw connection and the second thread to the second screw connection. The armouring element can be mounted via the first thread and pressed against the outside of the vehicle. The second thread can be used to mount the external load on the vehicle or connect it to the vehicle. Both threads can be arranged one behind the other in the axial direction, whereby the first thread can face the vehicle or the outside of the vehicle and the second thread can be arranged on the side of the mounting element facing away from the vehicle.

With regard to the two threads, it may be advantageous if the first thread has a larger diameter than the second thread. Due to the different diameters, different tightening torques and forces can also be transmitted via the corresponding screw connections. The larger first thread means that the contact pressure acting on the protective element due to the tightening torque can be distributed over a comparatively large area, thus reducing the contact pressure. The two differently sized threads can also lead to advantages during assembly, as the correct alignment of the mounting element can be felt and the assembly can therefore also be carried out blind, at least in part.

With regard to the two threads, it also may be advantageous if they have the same thread axis. In this respect, the two threads can be arranged concentrically and one behind the other in the axial direction. The thread axis can coincide with the mounting axis. The first thread can be arranged on the inner side of the mounting element, i.e. the side facing the vehicle, and the second thread can be arranged on the outer side of the mounting element, i.e. the side facing away from the vehicle.

With regard to the two tightening torques, it may be advantageous if the external load can be mounted via the second screw connection with the second tightening torque in such a way that the first tightening torque is lower than the second tightening torque. The external load can thus be connected to the mounting element with a comparatively high tightening torque and, for example, very firmly, whereby this tightening torque does not affect the tightening torque of the protective element. The protective element, on the other hand, can be mounted with a lower tightening torque, which prevents damage to the protective element. In this respect, for certain tightening torques and assembly situations, the protective element can even be arranged to be movable within certain limits in relation to the outside of the vehicle and thus also in relation to the mounting element, whereas the external load can be fixed and thus not movable. In this respect, the mounting device enables, for example, a floating mounting of the protective element, but at the same time also a fixed mounting of the external load. In particular, if the protective element is hollow, at least partially hollow, filled, grid-like, elastic within certain limits, provided with reactive or activatable elements or may not be subjected to high mechanical loads for other reasons, especially in the area of attachment to the vehicle, it can only be mounted with a comparatively low tightening torque in order to keep the compressive forces acting on the protective element below a predetermined limit value.

In a further development, it may be advantageous if the mounting device has a nut that can be screwed onto the first thread for mounting the protective element. The nut can, for example, be screwed onto the first thread by hand or with a tool such as a spanner. It may be advantageous if the nut can be screwed onto the first thread from the side facing the vehicle. By turning the nut, it can be moved back and forth on the first thread in an axial direction and thus also press against the protective element with a variable force. Depending on the position or the tightening torque of the nut, the protective element can thus be pressed against the outside of the vehicle with an adjustable force or pressure. In a potentially advantageous design, the nut is designed as a union nut.

To protect the protective element, it may be advantageous if a washer is provided between the nut and the protective element. This washer can prevent damage to the protective element and, for example, scratching of the protective element surface by the nut. Furthermore, the washer can be used to distribute the force exerted by the nut on the protective element over a larger area, which also prevents damage. The washer can be made of metal, in particular steel, and therefore have a high strength. The washer can be ring-shaped, whereby the centre axis of the washer can coincide with the mounting axis. The mounting element can extend centrally through the washer or through the annular recess in the washer.

According to a further development, it is proposed that an additional washer is provided for arrangement between the washer and the protective element. The additional disc can have the same size and the same geometric configuration as the washer.

With regard to the additional disc, it also may be advantageous if it can be compressed in the axial direction. The possible compression of the additional disc can limit the force acting on the protective element or the tightening torque of the nut. The compression can also ensure that the protective element can move within certain limits relative to the mounting element or the nut, particularly in the axial direction. In this respect, the additional disc can also provide a floating bearing for the protective element. The additional disc can be made of rubber or plastic, for example, and have a lower strength than the washer.

With regard to the washer, it may be advantageous if it has an inner cone. The inner cone can be arranged on the side of the washer facing the nut. The opposite side of the washer can be flat so that it rests as flat as possible on the additional washer or on the protective element. This ensures an even application of force to the protective element.

It may also be advantageous if the nut has an outer cone that corresponds to the inner cone of the washer. The nut or the corresponding outer cone can plunge into the washer when the nut is screwed in the direction of the protective element so that the outer cone of the nut makes contact with the inner cone of the washer. This immersion of the nut into the washer can reduce the axial length of the screw connection, whereby a smaller overall distance between the external load and the protective element can be achieved in the assembled state. This design also means that the external dimensions of the vehicle are only slightly increased by the additional external load and the external load can reach as close as possible to the protective element.

With regard to the second screw connection, it may be advantageous if the mounting device has a second nut that can be screwed onto the second thread for mounting the external load. The nut that can be screwed onto the second thread means that the external load can also be detachably mounted on the vehicle and thus easily removed or replaced with another external load.

With regard to the two nuts, it may be advantageous if the first nut and the second nut can be screwed onto the respective threads from different directions. The outer or second nut can therefore be screwed onto the mounting element or the corresponding thread from the outside and the inner or first nut from the inside. Both nuts can therefore move towards the centre of the mounting element when screwed on.

According to a further development, it is proposed that the nuts and the threads are designed in such a way that the nuts can be rotated in the same direction to generate the respective tightening torque. Firstly, the two nuts can be screwed onto the respective threads from different directions. To generate the tightening torque, the first nut can then be screwed in the opposite direction, i.e. basically unscrewed from the first thread again. The first nut can then move towards the protective element, allowing it to press the protective element against the outside of the vehicle.

With regard to the second screw connection, it may to be advantageous if a washer is provided between the second nut and the external load. Just as has already been explained with regard to the first screw connection, the washer of the second screw connection can also distribute the acting force or the acting tightening torque over a larger area of the external load and also prevent scratches when the nut is turned.

With regard to the mounting surface, it may be advantageous if this is arranged between the first thread and the second thread. When screwing on the respective nuts, they can thus be moved in the direction of the mounting surface. The mounting surface can be arranged perpendicular to the mounting axis and thus extend parallel to the first mounting plane or to the outside of the vehicle.

It also may be advantageous if the external load can be mounted on the mounting surface in a second mounting plane via the second screw connection. In this respect, the external load can also be mounted on the outside of the vehicle or on the vehicle via the mounting surface. The second mounting plane can extend parallel to the first mounting plane, so that the outer load can also be arranged parallel to the protective element.

According to a further development, it is proposed that the second thread is connected to the mounting surface via a cylindrical section extending in the axial direction, in particular a smooth cylindrical section. The second thread can thus be arranged at a distance from the mounting surface in the axial direction. The second thread may not extend as far as the mounting surface, but may end just before the mounting surface. The cylinder section can have the same diameter as the second thread and be seamlessly connected to it. In this context, smooth means that the cylinder section has no thread. The cylinder section can be approximately as long as the thickness of the external load. When mounted, the external load can be arranged on the cylinder section between the second nut screwed onto the thread and the mounting surface. This design means that the external load must be pushed forward over the second thread until it reaches the mounting position, but in the mounting position, when the external load is in contact with the mounting surface, it no longer comes into contact with the thread. The radial outer surface of the cylinder section can therefore serve as a support surface for the external load. The possibly sharp-edged thread cannot damage the external load in this respect, at least in the mounting position.

The mounting surface can be part of the mounting element and the mounting surface can be connected to the two threads. The mounting element can be a one-piece component that is not composed of several detachable or spaced-apart assemblies.

Furthermore, it may be advantageous if the mounting surface for mounting the external load is arranged on a collar that projects radially, in particular in relation to the first thread. The collar can protrude from the first thread in the manner of a ring and thus provide a surface for mounting the external load. In this respect, the collar can be designed as a connection collar. The collar can be integrally connected to the first and second threads. In an alternative embodiment, the collar can also be angular. Overall, the collar can be of a plate-shaped nature and thus narrow in the axial direction. This allows the collar to provide a sufficiently large mounting surface for mounting the external load, but at the same time requires very little space, particularly in the axial direction, so that the distance from the external load to the protective element can be small. The mounting surface can be arranged on the side of the collar facing the second thread, so that the external load is in contact with the collar or the mounting surface from the outside when mounted. The second mounting level can correspond to the mounting surface.

According to a further development, it may be advantageous if the transition between the collar and the first thread is conical. The corresponding cone can be designed to taper in the direction of the first thread, as the thread can have a smaller diameter than the collar or the mounting surface. The cone improves the stability of the collar so that it can absorb large forces and the second nut can therefore be tightened with a high tightening torque. The conical transition can basically act as a support in the axial direction so that the collar cannot be sheared off the mounting element even with high tightening torques.

With regard to the first nut, it may be advantageous if it has an inner cone to cover the transition between the collar and the first thread. This internal cone allows the nut to be screwed onto the first thread as far as possible in the direction of the mounting surface or the collar, which results in a very space-saving design in the axial direction, as the first thread can be shortened by this blanking. The two conical surfaces can lie against each other when the nut has reached its end position and has therefore been fully screwed onto the thread in the direction of the collar.

With regard to the mounting element, it may be advantageous if it has a third thread for screwing into the slug. The third thread can be independent of the other two threads and correspond approximately to the length of the slug. The mounting element can thus be screwed firmly into the slug so that the forces acting on the mounting element can be transferred into the slug and thus into the vehicle.

It may be advantageous if the mounting element has an interface, in particular an external hexagon, via which the mounting element can be screwed into the slug. In this respect, the mounting element can be screwed into the slug via the third thread using a tool, for example a spanner, and thus firmly connected to the outside of the vehicle. Alternatively, the interface can also be designed as a cross or slotted interface. A defined tightening torque can be applied via the interface so that the mounting element can be reliably mounted on the vehicle. The interface can be located in the outer end area of the mounting element and opposite the third thread.

With regard to the threads, it may be advantageous if the first thread is arranged between the second thread and the third thread. The second and third threads can be arranged in opposite end areas of the mounting element so that the mounting element can be connected to the slug at one end and the external load can be mounted on the mounting element or on the vehicle via the mounting element at the other end.

The third thread can have a smaller diameter than the first thread so that a diameter step, e.g. in the form of a shoulder, can be provided between the first thread and the third thread. The mounting element can be screwed into the slug until the diameter step rests on top of the slug and further screwing into the slug is then no longer possible. The diameter step means that the slug can always be screwed the same distance into the slug. This may be particularly advantageous if the protective element and/or the external load are to be mounted on the vehicle using several mounting devices, as the mounting surfaces of all mounting devices then have the same distance to the vehicle and it is ensured that the external load runs parallel to the vehicle surface.

With regard to the task mentioned at the beginning, a protective device for protecting a military vehicle with a protective element and an external load is also proposed, wherein the protective element and the external load can be mounted on the military vehicle via a common mounting device and the mounting device is designed in the manner described above. This may result in the advantages already described with regard to the mounting device.

With regard to the slug, which can be part of the protective device, it may be advantageous if it is designed as a screw-in slug. A screw-in slug can enable a stable, yet detachable connection of the protective element and the external load to the vehicle or to the outside of the vehicle. The slug can be firmly connected to the outside of the vehicle, in particular welded to it. Large forces can be transferred to the vehicle via a welded connection and, in this respect, heavy external loads can also be mounted.

With regard to the protective element, it may be advantageous if this has a recess, in particular a circular recess, which is larger than the outer diameter of the slug, so that the protective element can be applied directly to the outside of the vehicle. The slug can protrude from the outside of the vehicle and then be arranged in the recess of the protective element. In this respect, the slug can already hold or secure the protective element in the radial direction during assembly before it is firmly mounted on the vehicle in the axial direction by the assembly device. Before mounting, the protective element can be positioned in such a way that the slug is located in the recess and the protective element is in contact with the outside of the vehicle in the first mounting plane. The protective element can be held in this position by the slug on the outside of the vehicle, which makes installation using the mounting device much easier. In particular, if several slugs are arranged on the outside of the vehicle and the protective element accordingly also has several recesses, one for each slug, even large protective elements can be easily mounted using the mounting devices and secured in the respective slugs.

With regard to the protective element and the external load, it may be advantageous if these are spaced apart and arranged parallel to each other. The protective element and the external load can both have a flat geometry and extend parallel to the outside of the vehicle. The spacing can depend primarily on the length of the first thread or the length of the first nut and the thickness of the collar. Due to the spaced arrangement of the protective element and the external load as well as the outwardly parallel offset mounting surface or second mounting plane in relation to the first mounting plane, the external load can only transmit forces to the protective element to a very small extent.

In order to mount the external load, this can also have a recess, in particular a circular recess. The outer load can be pushed forward over the third thread via the recess until it lies as flat as possible against the mounting surface. If the external load is mounted on the vehicle using several mounting devices, several recesses can also be provided accordingly. Since the second thread can have a smaller diameter than the slug, the diameter of the recess in the outer load can also be smaller than the diameter of the recess in the protective element.

With regard to the external load, it may be advantageous if it is designed as a shelf or as part of a shelf. A shelf can provide additional storage space on the outside of the vehicle and can be used, for example, to hold items that are primarily required outside the vehicle and not in the vehicle interior. For example, the external load to be mounted can be a rear sheet metal part facing the vehicle, in particular a rear wall of a shelf or stowage device.

Alternatively, the external load can also be designed as a further protective element. which can further increase the vehicle's armouring. It can also be advantageous in this respect if the second protective element is arranged at a distance from the first protective element.

Furthermore, the disclosure sets itself the task of specifying a method for mounting a protective element, in particular on a military vehicle, with a mounting device, wherein the method permits mounting of external loads, but the tightening torque of the protective element is not excessively increased by the external loads.

For the solution, it is proposed that the mounting device has a mounting element extending along a mounting axis, wherein the protective element is mounted in a mounting plane via a screw connection with a defined tightening torque, wherein the mounting element has a mounting surface which is arranged offset outwards in the axial direction relative to the mounting plane and on which an external load is mounted via a second screw connection with a second tightening torque in such a way that the first and second tightening torques are independent of each other. It may be advantageous if the method is carried out with a mounting device or if a mounting device as described above is used for the method. This may result in the advantages already described with regard to the assembly device. Furthermore, the advantages already described with regard to the protective device can also result.

With regard to the method, may be advantageous if the first nut is screwed onto the mounting element in a first direction onto the first thread to mount the protective element, then the mounting element is attached to the outside of the vehicle, in particular screwed into the slug, and then the nut is turned in the opposite direction with the first tightening torque. until it presses the protective element onto the outside of the vehicle. To turn the nut onto the first thread, it can be advanced in the axial direction over the smaller third thread until it reaches the first thread. In order to be able to screw the nut directly onto the first thread, the third thread can also have a smaller diameter than the first thread. So that the third thread can be screwed completely into the slug, the nut can therefore first be screwed at least a little onto the first thread, in particular at least so far that the nut no longer protrudes in the axial direction in relation to the first thread. When the mounting element has then been connected to the slug, the protective element, which has already been positioned on the outside of the vehicle, can still be moved in the axial direction between the outside of the vehicle and the nut. By turning the nut in the opposite direction, it can be moved towards the outside of the vehicle and thus also towards the protective element. If the nut then reaches and contacts the protective element at a certain point, possibly by making indirect contact via the washer and/or intermediate washer, the nut can press the protective element against the outside of the vehicle with a force that depends on the tightening torque, so that it is then firmly mounted on the vehicle. The protective element is then fixed between the nut or the washer and/or additional washer and the outside of the vehicle and can no longer be moved.

In a further development of the process, it may be advantageous if the second nut is screwed onto the second thread in a next step in order to mount the external load. To do this, the external load can first be advanced over the second thread in an axial direction until it is in contact with the mounting surface. The external load can then be fixed in this position by screwing the nut onto the second thread until it comes into contact with the external load, possibly via the washer. The outer load can then be pressed against the mounting surface using the second tightening torque.

The screw connection can be designed in such a way that it can be used to carry out a process in the manner described above.

BRIEF DESCRIPTION OF DRAWINGS

Further details and advantages of the invention will be explained in more detail below with reference to the accompanying schematic drawings of two embodiments, as described below.

DETAILED DESCRIPTION

Figure 1:
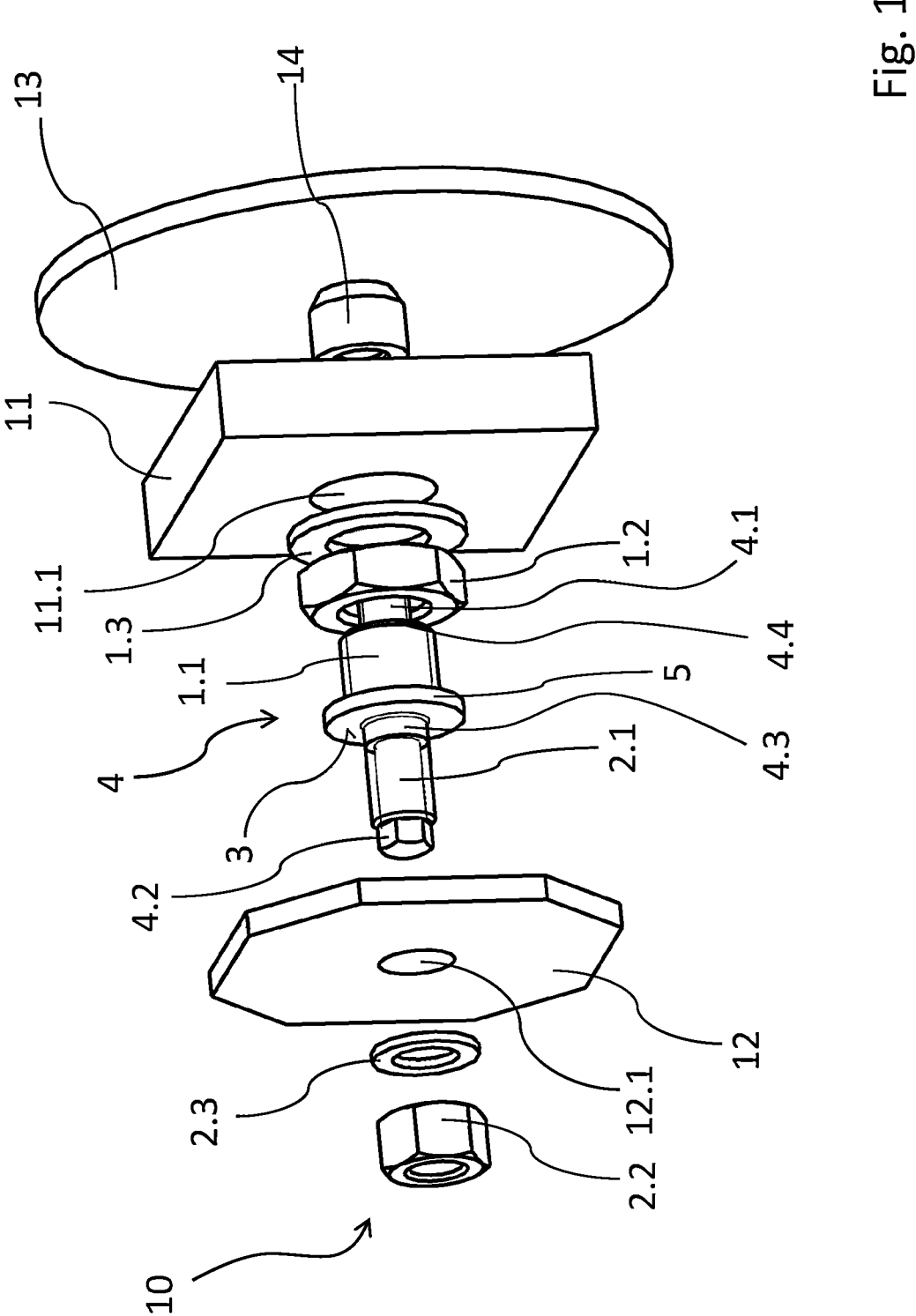
FIG. 1 shows an assembly device according to a first embodiment example in an exploded view.

The illustration in FIG. 1 shows a mounting device 10 according to a first embodiment example, via which both a protective element 11 and an external load 12 can be mounted on the outside 13 of a vehicle. The protective element 11 can be used to increase the protective effect of the vehicle, and the possibility of also arranging an external load 12 on the outside of the vehicle means that the storage space of the vehicle can be increased overall. This is because it is not necessary to carry the external load 12 in the vehicle due to the external mounting. It is also possible for the external load 12 itself to provide additional storage space, for example if it is designed as a shelf.

The protective element 11 and the external load 12 can be mounted with two independent screw connections 1, 2 and therefore also with two independent tightening torques F1, F2 using the mounting device 10. In this respect, it is possible that the outer load 12 arranged further out at is mounted with greater force or a greater tightening torque F2 than the protective element 11 arranged further in. In this respect, very heavy outer loads 12, which require a high tightening torque F2, can also be used together with protective elements 11, which may only be mounted with a low tightening torque in comparison, for example to prevent damage to the protective elements 11.

In order to connect the protective element 11 and the external load 12 to the vehicle or the outside of the vehicle 13, the mounting device 11 has a mounting element 4, which is essentially cylindrical in shape and can be recognized in particular in the illustration in FIG. 1. The mounting element 4 has a thread 4.1, via which it can be screwed into a boss 14 arranged on the outside of the vehicle 13 in the manner of a screw. The slug 14 is firmly connected to the outside of the vehicle 13 via a welded connection and therefore enables reliable force transmission into the vehicle or the outside of the vehicle. So that the mounting element 4 can be screwed into the slug 14, the latter has an internal thread corresponding to the thread 4.1 of the mounting element 4, so that the mounting element 4 can be detachably connected to the vehicle or the outside of the vehicle 13 via the slug 14.

In order to rotate the mounting element 4 about the mounting axis M and screw it into the slug 14, the mounting element 4 has an interface 4.2 at the end opposite the thread 4.1. In the embodiment example, this interface is designed in the form of an external hexagon and thus enables the mounting element 4 to be easily screwed into the slug 14 like a screw using a spanner.

Figures 2A, 2B:
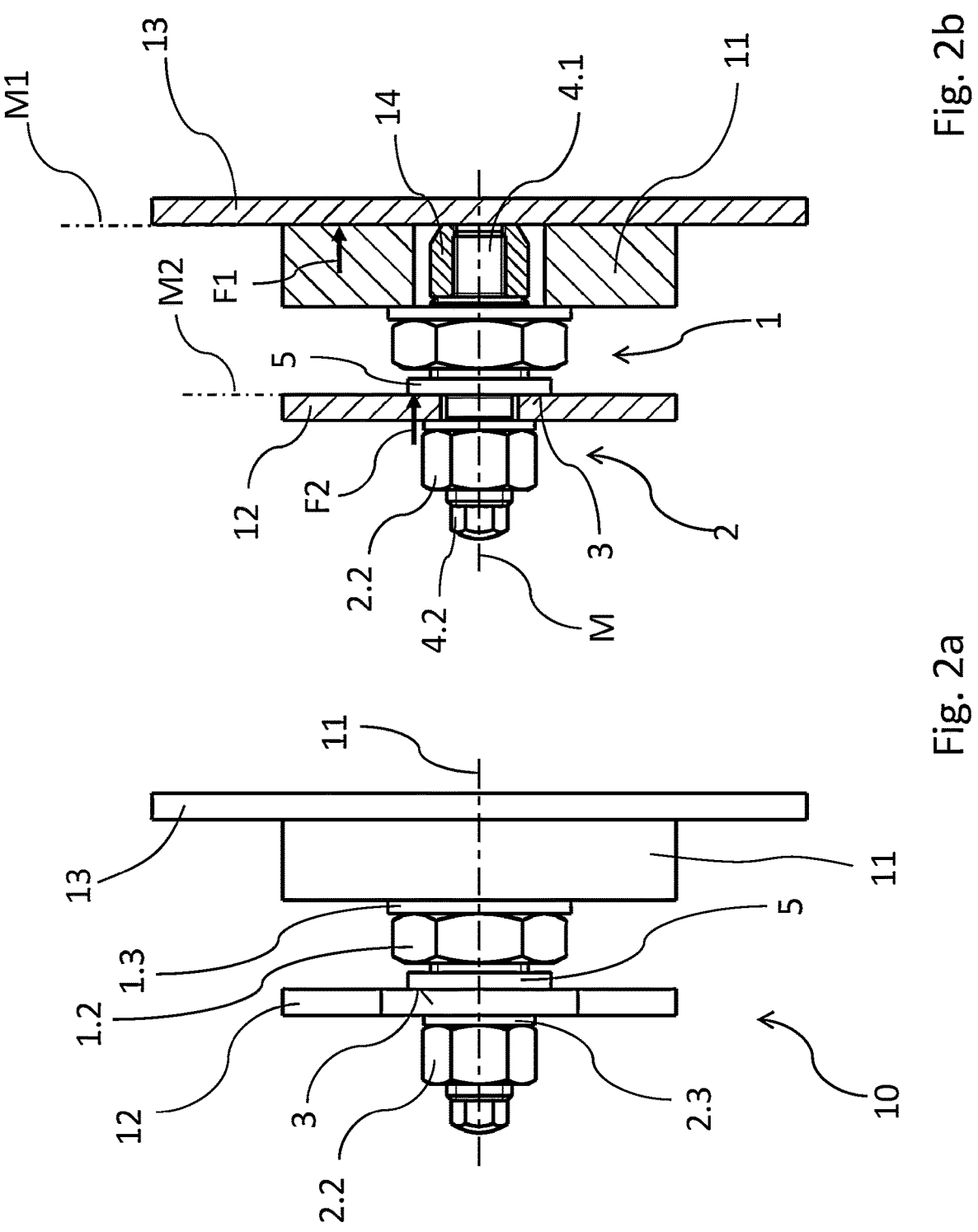
FIG. 2*a* is a side view of the assembly device as shown in FIG. 1 in the assembled state.
FIG. 2*b* shows the assembly device according to FIG. 2*a* in a side sectional view.

The screwed-in mounting element 4 then protrudes vertically from the outside of the vehicle 13, which can also be seen from the mounting axis M shown in FIGS. 2*a* and 2*b*, which extends through the centre of the mounting element 4. Since the direction of the mounting element 4 or the mounting axis M depends on the alignment of the slug 14 and its thread, the slug 14 is accordingly arranged at a right angle to the outside of the vehicle 13 and the internal thread of the slug 14 or the thread axis of the slug 14 also runs perpendicular to the outside of the vehicle 13 or to the mounting plane MI of the protective element 11.

In addition to the thread 4.1, the mounting element 4 has two further threads 1.1 and 2.1, whereby the first thread 1.1 belongs to the first screw connection 1 for mounting the protective element 11 and the second thread 2.1 belongs to the second screw connection 2 for mounting the external load 12. Furthermore, the nuts 1.2 and 2.2 also shown in the illustrations belong to the respective screw connections 1, 2 and the respective tightening torques F1, F2 can be applied to the protective element 11 or to the external load 12 via these. The assembly of the protective element 11 and the external load 12 using the assembly device 10 is now described in more detail below.

In order to mount the protective element 11 first, it must be brought into a position in which the slug 14 is arranged inside the recess 11.1 of the protective element 11. In this position, the protective element 11 is basically on the outside of the vehicle 13 and cannot be moved in the vertical direction due to the slug 14 extending into the recess 11.1, but is not yet secured in the axial direction. In the next assembly step, the nut 1.2 is first screwed a little onto the thread 1.1 of the mounting element 4 and the washer 1.3 shown in FIG. 1 is moved over the end of the mounting element 4 and positioned behind the nut 1.2. The mounting element 4 together with the screwed-on nut 4.1 is then screwed into the slug 14 via the interface 4.2 in the manner described above. Since the third thread 4.1 has a smaller diameter than the first thread 1.1, a diameter step 4.4 is arranged between these two threads in the manner of a shoulder. The mounting element 4 is now screwed into the slug 14 until the diameter step 4.4 rests on the top of the slug 14, so that the mounting element 4 cannot be screwed any further into the slug 14. In this position, the nut 1.2 has a certain axial distance from the protective element 11, so that the latter is not yet fixed in the axial direction, but can be moved back and forth between the outside of the vehicle 13 and the nut 1.2.

To tighten the protective element 11 with a defined tightening torque F1 and press it against the outside of the vehicle 13, the nut 1.2 is unscrewed from the thread 1.1 in the opposite direction until the washer 1.3 makes contact with the protective element 11. The tightening torque F1 and thus the contact pressure acting on the protective element 11 can then be adjusted by turning the nut 1.2. The washer 1.3 located between the nut 1.2 and the outside of the vehicle 13 ensures that the surface of the protective element 11 is not scratched when the nut 1.2 is turned, as the nut 1.2 does not come into direct contact with the protective element 11. As can be seen in FIG. 2*b*, the protective element 11 then lies as flat as possible against the outside of the vehicle 13 when mounted and the mounting plane Ml of the protective element 11 corresponds to the outside of the vehicle 13.

When the protective element 11 is mounted accordingly, the outer end of the mounting element 4 protrudes vertically from the protective element 11, so that the external load 12 can be mounted on this free end. For this purpose, the mounting element 4 has the second thread 2.1 in this area, which together with the nut 2.2 forms the second screw connection 2, via which the external load 12 can also be detachably mounted to the slug 14 or to the vehicle.

Between the first thread 1.1 and the second thread 2.1, the mounting element 4 has a collar 5 projecting in a radial direction, the surface of which pointing towards the outer end of the mounting element 4 is designed as a mounting surface 3. This mounting surface 3 extends perpendicular to the mounting axis M and is thus arranged parallel to the outside of the vehicle 13. The mounting surface 3 makes it possible to connect the external load 12 to the mounting element 4 independently of the protective element 11 and also to the vehicle. Similar to the protective element 11, the outer load 12 has a recess 12.1 for mounting, which corresponds approximately to the diameter of the second thread 2.1. The outer load 12 can therefore be pushed forward in an axial direction over the second thread 2.1 until it rests against the mounting surface 3.

As can be seen in the illustration in FIG. 1, the thread 2.1 does not extend as far as the collar 5 or the mounting surface 3, but ends a little before it. The cylinder section 4.3 adjoining the thread 2.1 has approximately the same diameter as the thread 2.1, but is not itself provided with a thread. The cylindrical section 4.3 serves to ensure that the external load 12 or the recess 12.1 does not come into direct contact with the thread 2.1 in the mounted position.

When the external load 12 is in contact with the mounting surface 3, it can be fixed to the mounting surface 3 via a nut 2.2 that can be screwed onto the thread 2.1, so that the external load 12 is then clamped between the nut 2.2 and the collar 5. A washer 2.3 is also provided between the nut 2.2 and the external load 12, which, like the washer 1.3 between the nut 1.2 and the protective element 11, prevents the external load 12 from being damaged by the nut 2.2. Thanks to the collar 5 and the corresponding mounting surface 3, the external load 12 can thus be mounted on the vehicle in a mounting plane M2 that is parallel to the mounting plane M1. The external load 12 is then arranged parallel to and at a distance from the protective element 11 due to this mounting.

Depending on how tightly the nut 2.2 is tightened, the contact pressure with which the external load 12 is pressed onto the mounting surface 3 changes. The corresponding tightening torque F2 of the nut 2.2 is independent of the tightening torque F1 of the nut 1.2. This means that the external load 12 can be mounted with a greater tightening torque F2 than the protective element 11 and that the tightening torque F2 does not affect the tightening torque F1. Even if, for example, the external load 12 is very heavy and therefore requires a high tightening torque F2 and the protective element 11 may only be mounted with a low tightening torque F2, for example to prevent damage, the mounting device 10 enables both elements to be mounted simultaneously via just one connection point on the vehicle.

Figure 3:
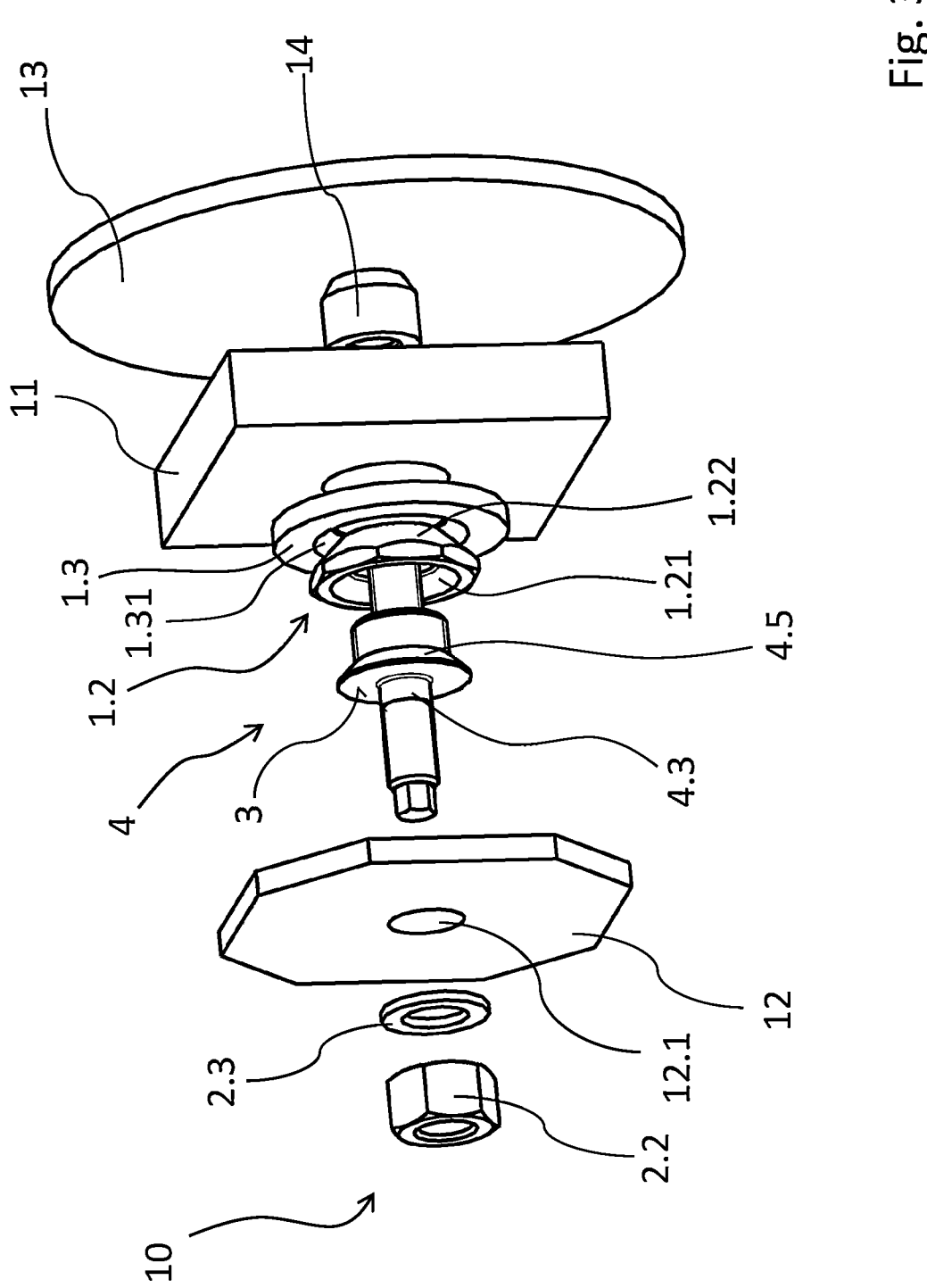
FIG. 3 shows an assembly device according to a second embodiment example in an exploded view.

A further embodiment example will now be described below with reference to FIGS. 3, 4a and 4b, which differs primarily with regard to the design of the nut 1.2, the washer 1.3 and the transition 4.5 between the collar 5 and the first thread 1.1. With regard to the other elements and the basic mode of operation of the assembly device 10, reference is made to the above description of the first embodiment example, which is shown in FIGS. 1, 2a and 2b, in order to avoid repetition.

Figures 4A, 4B:
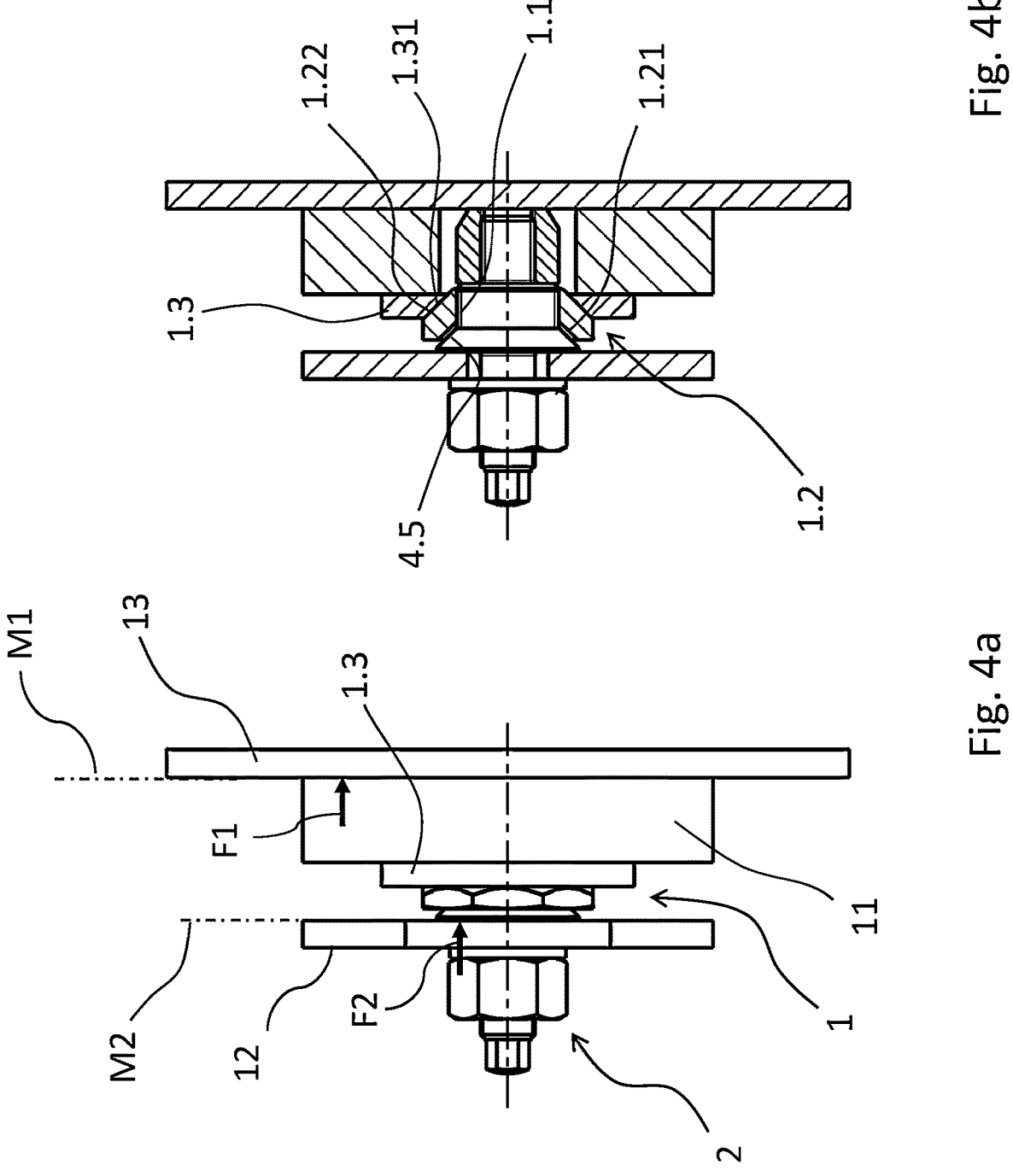
FIG. 4*a* is a side view of the assembly device according to FIG. 3 in the assembled state.
FIG. 4*b* shows the assembly device as shown in FIG. 4*a* in a side sectional view.

What is noticeable when comparing the first and second embodiment examples, for example on the basis of the illustrations in FIGS. 2b and 4b, is that the distance between the protective element 11 and the external load 12 is smaller in the second embodiment example. Accordingly, the two mounting planes M1, M2 are also closer together in the axial direction in the second embodiment example and the mounting element 4 and the first thread 1.1 are somewhat shorter overall.

The reason for this smaller axial distance is primarily associated with the fact that the nut 1.2 and the washer 1.3 are not merely arranged one behind the other in the axial direction as in the first embodiment example, but that the nut 1.2 plunges into the washer 1.3 and even penetrates it, as can be seen in the sectioned side view of FIG. 4b. The washer 1.3 therefore does not increase the axial distance between the two mounting surfaces M1, M2, but nevertheless ensures that the force of the nut 1.2 is distributed over a certain area around the recess 11.1 and that the nut 1.2 does not come into direct contact with the protective element 11 to prevent damage.

In terms of design, the nut has an outer cone 1.22 on its side facing the protective element 11 or the washer 1.3 and the washer 1.3 has a correspondingly shaped inner cone 1.31. The angles of the two cones 1.22 and 1.31 are approximately identical, so that the nut 1.2 and the washer 1.3 make contact over as large an area as possible. Due to the two conical surfaces, the tip of the nut 1.2 can penetrate the washer 1.3, but at the same time transmit the contact pressure acting in the axial direction to mount the protective element via the washer 1.3 to the protective element 11 and thus press it against the outside of the vehicle 13.

On the opposite side, the nut 1.2 also has a conical surface, which, however, is designed in the manner of an internal cone 1.21. Furthermore, the transition 4.5 between the collar 5 and the first thread 1.1 is also tapered in the direction of the first thread 1.1, whereby the tapered surface of the transition 4.5 is essentially parallel to the tapered surface of the inner cone 1.21 of the nut 1.2. When the nut 1.2 is screwed onto the first thread 1.1, it can thus be turned very far in the direction of the mounting surface 3 and at least partially cover the transition 4.5 or the collar 5, or the conical transition 4.5 can at least partially dip into the nut 1.2.

In the second embodiment example, the design or the interaction of the nut 1.2 and the transition 4.5 as well as the nut 1.2 and the washer 1.3 thus leads to an axial shortening of the mounting element 4 and thus to a reduction in the distance between the two mounting levels M1, M2.

REFERENCE SIGNS

1 Screw connection
1.1 Thread
1.2 Nut
1.21 Inner cone
1.22 Outer cone
1.3 Washer
1.31 Inner cone
2 Screw connection
2.1 Thread
2.2 Nut
2.3 Washer
3 Mounting surface
4 Mounting element
4.1 Thread
4.2 Interface
4.3 Cylinder section
4.4 Diameter jump
4.5 Transition
5 Collar 10 Mounting device
11 Protective element
11.1 Recess
12 External load
12.1 Recess
13 Vehicle exterior
14 Slug
F1 Tightening torque
F2 Tightening torque
M1 Mounting level
M2 Mounting level
M Mounting axis Having described the invention in detail and by reference to the various embodiments, it should be understood that modifications and variations thereof are possible without departing from the scope of the claims of the present application.

What is claimed is:

1. A mounting device for mounting a protective element on a vehicle, with a mounting element extending along a mounting axis,
   wherein the protective element is configured to be mounted via a first screw connection with a defined first tightening torque in a mounting plane, wherein the mounting axis extends perpendicular to the mounting plane,
   wherein the mounting element has a mounting surface which is arranged offset outwards in an axial direction relative to the mounting plane and wherein the mounting element is configured such that an external load is mountable via a second screw connection with a second tightening torque in such a way that the first and second tightening torques are independent of one another.

2. The mounting device according to claim 1, wherein the mounting element has a first thread to form the first screw connection and a second thread to form the second screw connection, the first thread having a larger diameter than the second thread.

3. The mounting device according to claim 2, further including a nut which is configured to be screwed onto the first thread for mounting the protective element, wherein the nut is a union nut and configured to be screwed onto the first thread from the side facing the vehicle.

4. The mounting device according to claim 3, further including a washer for positioning between the nut and the protective element, wherein the washer has an inner cone and wherein the nut has an outer cone configured to correspond with the inner cone of the washer.

5. The mounting device according to claim 3, further including an additional washer for positioning between the washer and the protective element, wherein the additional washer is compressible in the axial direction.

6. The mounting device according to claim 3, further including a second nut configured to be screwed onto the second thread for mounting the external load, wherein the nut and the second nut are configured to be screwed onto the respective threads from different directions.

7. The mounting device according to claim 6, wherein the nuts and the threads are configured such that the nuts can be rotated in the same direction to generate the respective tightening torque.

8. The mounting device according to claim 2, wherein the mounting surface is positioned between the first thread and the second thread.

9. The mounting device according to claim 2, wherein the second thread is connected to the mounting surface via a smooth cylindrical section extending in the axial direction.

10. A protective device for protecting a vehicle with a protective element and an external load, wherein the protective element and the external load are configured to be mounted on the vehicle via a common mounting device, wherein the mounting device is configured according to claim 1.

11. The protective device according to claim 10, wherein the external load is a shelf.

12. The mounting device according to claim 1, wherein the first screw connection and the second screw connection are axially aligned along the mounting axis.

13. The mounting device according to claim 1, wherein the first screw connection and the second screw connection are axially aligned and entirely axially spaced apart from each other.

14. A mounting device for mounting a protective element on a vehicle, with a mounting element extending along a mounting axis,
   wherein the protective element is configured to be mounted via a first screw connection with a defined first tightening torque in a mounting plane,
   wherein the mounting element has a mounting surface which is arranged offset outwards in an axial direction relative to the mounting plane and on which an external load can be mounted via a second screw connection with a second tightening torque in such a way that the first and second tightening torques are independent of one another, wherein the mounting element has a first thread to form the first screw connection and a second thread to form the second screw connection, the first thread having a larger diameter than the second thread, the mounting device further including a nut which is configured to be screwed onto the first thread for mounting the protective element, wherein the nut is a union nut and configured to be screwed onto the first thread from the side facing the vehicle, wherein the mounting surface for mounting the external load is positioned on a radially projecting collar.

15. The mounting device according to claim 14, wherein the nut has an inner cone for covering the transition between the collar and the first thread.

16. A method for mounting a protective element on a vehicle, with a mounting device, wherein the mounting device has a mounting element extending along a mounting axis, wherein the protective element is mounted via a screw connection with a first tightening torque in a mounting plane, wherein the mounting element has a mounting surface which is arranged offset outwards in an axial direction relative to the mounting plane and on which an external load is mounted via a second screw connection with a second tightening torque in such a way that the first and second tightening torques are independent of one another, wherein the mounting axis extends perpendicular to the mounting plane.

17. The method according to claim 16, and wherein, for mounting the protective element, a nut is screwed in a first direction onto a first thread of the mounting element in a first direction, then the mounting element is fastened to the outside of the vehicle by being screwed into a boss, and then the nut is turned in the opposite direction with the first tightening torque until it presses the protective element onto the outside of the vehicle.

18. The method according to claim 16, wherein the first screw connection and the second screw connection are axially aligned along the mounting axis.

19. The method according to claim 16, wherein the first screw connection and the second screw connection are axially aligned and entirely axially spaced apart from each other.

\* \* \* \* \*